United States Patent [19]

Vessels

[11] 4,381,078
[45] * Apr. 26, 1983

[54] AGRICULTURAL SPRAY NOZZLE WITH FLUID OPERATED ORIFICE CLEANING MEMBER

[76] Inventor: John B. Vessels, R1 Box 69, Webster, Ky. 40176

[*] Notice: The portion of the term of this patent subsequent to Feb. 3, 1998, has been disclaimed.

[21] Appl. No.: 220,501

[22] Filed: Dec. 29, 1980

[51] Int. Cl.³ .............................................. B05B 15/02
[52] U.S. Cl. .................................................. 239/118
[58] Field of Search .............................. 239/114–118, 239/123; 222/149

[56] References Cited

U.S. PATENT DOCUMENTS

| | | | |
|---|---|---|---|
| 2,721,762 | 10/1955 | Bates | 239/118 |
| 3,347,463 | 10/1967 | Baker | 239/118 X |
| 4,248,381 | 2/1981 | Vessels | 239/118 |

*Primary Examiner*—Andres Kashnikow

[57] ABSTRACT

Improvements in a spray nozzle with fluid operated orifice cleaning member, these improvements consisting of an additional conduit connecting the lower chamber with the source, distance limiting devices limiting the distance of travel of the diaphragm, and a resilient washer to be compressed upon the downward movement of the diaphragm to minimize dripping.

3 Claims, 2 Drawing Figures

AGRICULTURAL SPRAY NOZZLE WITH FLUID OPERATED ORIFICE CLEANING MEMBER

SUMMARY

In the following specification I will explain three physical problems encountered in the operation of the "Agricultural Spray Nozzle with Fluid Operated Orifice Cleaning Member", and will solve those physical problems and will claim these solutions as my invention.

The afformentioned physical problems and solutions are:

1. In my original application (Ser. No. 4,167) U.S. Pat. No. 4,248,381, I relied upon the nozzle orifice as an escape for the fluid present in the lower chamber when fluid was introduced into the upper chamber. If this nozzle orifice is blocked, movement of the diaphragm-punch assembly is sluggish or non-existant. In order to overcome this problem a second exhaust conduit is added.

2. In use, the only limit of movement of the diaphragm center is the physical strength of the material comprising the diaphragm. In order to avoid damage to the diaphragm, I have introduced mechanical stops.

3. In my original claims, I claimed that my invention minimized dripping. In order to be able to claim that this device stops dripping, I have installed a flexible, pliable, sealing device.

DESCRIPTION

Figure 1:
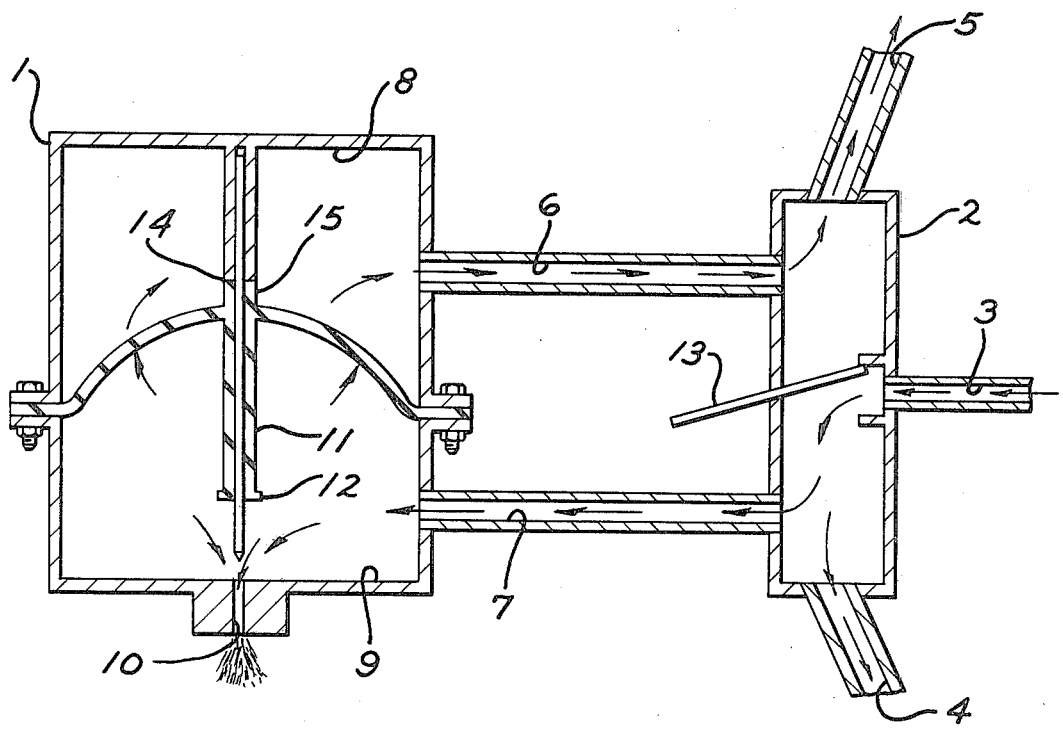
FIG. 1 shows the "Agricultural Spray Nozzle with Fluid Operated Cleaning Member" in the spraying position and includes the new parts.
Figure 2:
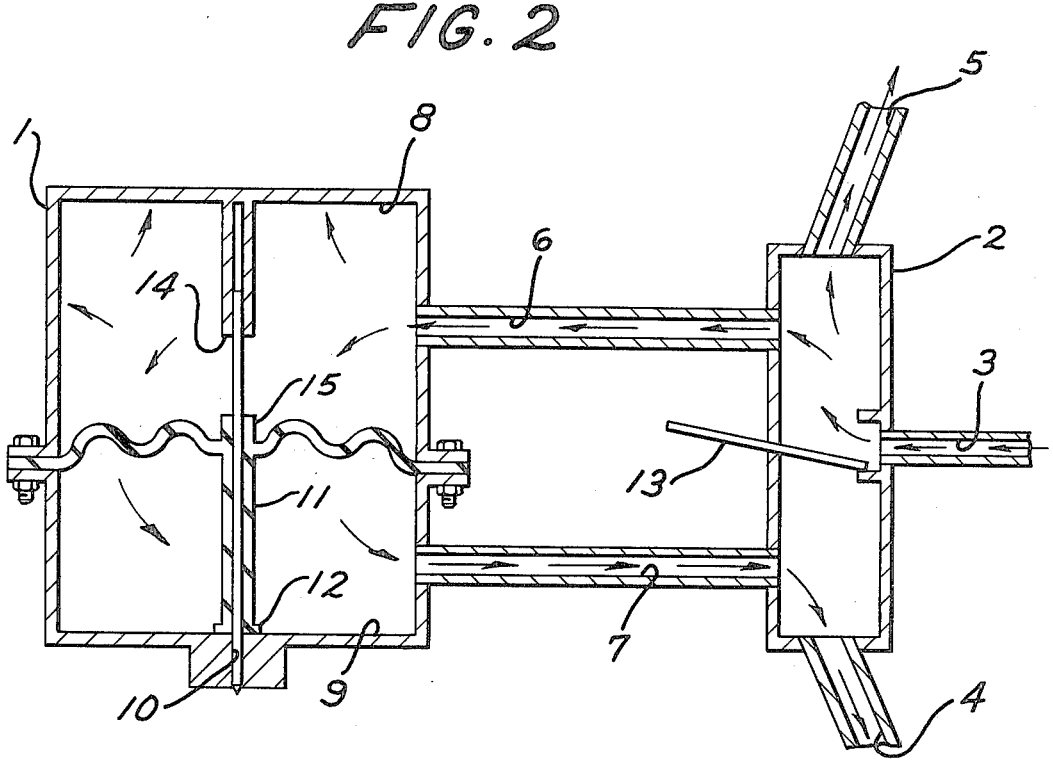
FIG. 2 shows the "Agricultural Spray Nozzle with Fluid Operated Cleaning Member" in the cleaning position and includes new parts.

FIGS. 1 and 2 show the working and structural parts of my invention and are as follow:
1. Nozzle holder assembly
2. Schematic view of the directional control fluid valve
3. Inlet conduit from the source
4. Outlet conduit and return conduit to the source (new)
5. Outlet conduit and return conduit to the source
6. Supply conduit for the upper chamber
7. Supply conduit for the lower chamber
8. Upper chamber
9. Lower chamber
10. Nozzle orifice
11. Connector (connects punch with diaphragm with a press fit and also serves as a stop (new)
12. Seal—washer shaped device constructed of a rubber-like material (new)
13. Control lever for directional control fluid valve (schematic view)
14. Stop—a minor adjustment of the shape of the lower end of the guide structure (new)
15. A spacer in the shape of a cylinder, surrounding the punch above the diaphragm (new)

In order to provide a ready and reliable escape for the trapped fluid in lower chamber 9 when the diaphragm is forced downward by the introduction of fluid into upper chamber 8, an outlet and return conduit 4 is provided. Upon the introduction of pressurized fluid into upper chamber 8, the diaphragm center is forced down. The fluid present in lower chamber 9 is easily and readily exhausted through supply conduit 7, through the lower section of directional control fluid valve 2, and finally through outlet conduit 4 to the source.

In the operation of the "Agricultural Spray Nozzle with Fluid Operated Cleaning Member" the diaphragm-punch assembly has the freedom to move as far as the structural elements will allow, the only other limiting factor being the strength and elasticity of the diaphragm. In order to provide a more reliable and a more durable device and to encourage a longer diaphragm life, a stop 14 and a spacer 15 have been added. The stop 14 consists of a change in the manufacture of that portion of the nozzle holder assembly which contains the guide leaving the bottom portion of the structure of the guide in a shape and form that will fit and stop the upward movement of spacer 15. Spacer 15 is merely a block of material of sufficient rigidity to stop the upward movement of the diaphragm center when it contacts stop 14. Spacer 15 can be shaped as a cylinder and fits around the punch at a point between the diaphragm and the lower end of the guide, referred to above as stop 14. Spacer 15 is of such a length so as to stop the diaphragm-punch assembly's upward movement at a point where the punch is completely removed from the orifice 10 and no longer interferes with the flow of fluid entering orifice 10.

The connector 11 serves as a movement limiting device which stops the downward movement of the diaphragm center at a point, after the punch has entered, moved through, and where said punch extends beyond lower extremity of orifice 10. This stopping action is effected when the lower end of connector 11 comes in contact with the structure which surrounds nozzle orifice 10. Although connector 11 was shown in my prior application (Ser. No. 4,617) it was not referred to in this respect and was not claimed as a movement limiting device.

In use, when the "Agricultural Spray Nozzle with Fluid Operated Cleaning Member" is in the position shown in FIG. 2, dripping is minimized, however dripping is not stopped. The addition of a flexible, pliable, rubberlike washer 12, glued or otherwise attached to the lower end of connector 11 causes a drip-proof seal when connector 11 is moved downward to a point where it presses washer 12 against the structure which surrounds nozzle orifice 10. Connector 11 is shortened approximately half the thickness of washer 12 in order to keep the same distance of downward movement of the punch.

I claim:

1. In an agricultural spray device having an upper pressure chamber and a lower pressure chamber, said chambers being divided by a diaphragm, said lower pressure chamber including a nozzle having an outlet orifice; a source of spray material; a first conduit means connecting said source with said chambers; valve means in said first conduit means for controlling the flow of material to either the upper or the lower chamber; a second conduit means connecting said upper chamber with said source for allowing material to flow out of said upper chamber to said source when said valve means is directing spray material to said lower chamber; and a punch affixed to said diaphragm, said punch having a diameter slightly smaller than said orifice and being movable in and out of said orifice so as to punch out any dirt or foreign material tending to clog said orifice, said punch also minimizing dripping when in said orifice said punch being movable into the orifice when said valve means allows material to flow to said upper chamber, said punch being movable out of said orifice when said valve means allows flow of material to said lower chamber; the improvement comprising: a third conduit means connecting said lower chamber with said source of spray material for allowing said spray material to flow out of said lower chamber to said source of spray material when said valve means is directing spray material to the upper chamber.

2. In an agricultural Spray device as in claim 1, further including distance limiting devices for restricting the distance traveled by said diaphragm, one distance limiting device limiting the distance of upward movement of said diaphragm the other distance limiting device limiting the downward movement of said diaphragm; said other distance limiting device striking a stop that surrounds said orifice.

3. In an agricultural spray device as in claim 2 further including a rubber-like washer attached to a lower end of said other distance limiting device, said washer adapted to be compressed between said other distance limiting device and said stop when said downward distance limiting device acts to stop the downward movement of said diaphragm.

* * * * *